United States Patent
Varma et al.

(10) Patent No.: US 9,546,514 B2
(45) Date of Patent: Jan. 17, 2017

(54) METHOD FOR THE PRODUCTION OF FIRE RESISTANT GLAZINGS

(71) Applicant: Pilkington Group Limited, St Helens (GB)

(72) Inventors: Karikath Su Varma, Southport (GB); David Holden, Wigan (GB); John Richard Holland, Ormskirk (GB)

(73) Assignee: Pilkington Group Limited, St. Helens (GB)

( * ) Notice: Subject to any disclaimer, the term of this patent is extended or adjusted under 35 U.S.C. 154(b) by 0 days.

(21) Appl. No.: 14/305,859

(22) Filed: Jun. 16, 2014

(65) Prior Publication Data

US 2014/0360652 A1 Dec. 11, 2014

Related U.S. Application Data

(60) Continuation of application No. 13/301,407, filed on Nov. 21, 2011, now abandoned, which is a division of application No. 12/312,056, filed as application No. PCT/GB2007/050662 on Oct. 30, 2007.

(30) Foreign Application Priority Data

Oct. 31, 2006 (GB) .................................. 0621568.5

(51) Int. Cl.
| | |
|---|---|
| *B29C 39/12* | (2006.01) |
| *E06B 3/673* | (2006.01) |
| *B32B 17/10* | (2006.01) |
| *C09K 21/02* | (2006.01) |
| *B32B 17/06* | (2006.01) |

(52) U.S. Cl.
CPC .............. *E06B 3/673* (2013.01); *B29C 39/126* (2013.01); *B32B 17/069* (2013.01); *B32B 17/10917* (2013.01); *C09K 21/02* (2013.01)

(58) Field of Classification Search
None
See application file for complete search history.

(56) References Cited

U.S. PATENT DOCUMENTS

| | | | | |
|---|---|---|---|---|
| 6,229,691 | B1 * | 5/2001 | Tanzer ................ | H01R 25/006 |
| | | | | 361/610 |
| 6,479,156 | B1 * | 11/2002 | Schmidt et al. ............. | 428/428 |
| 8,057,905 | B2 * | 11/2011 | Goelff ............................ | 428/428 |
| 8,932,508 | B2 * | 1/2015 | Varma .................... | C09K 21/02 |
| | | | | 264/333 |
| 2006/0257668 | A1 * | 11/2006 | Frommelt ......... | B32B 17/10045 |
| | | | | 428/428 |

FOREIGN PATENT DOCUMENTS

JP 09-227179 * 9/1997

* cited by examiner

*Primary Examiner* — Edmund Lee
(74) *Attorney, Agent, or Firm* — Marshall & Melhorn, LLC

(57) ABSTRACT

Fire resistant glazings having improved properties comprising a silicate based interlayer which contains from 35% to 43% by weight of water may be produced using a cast in place process. The amount of water in the interlayer is reduced by concentrating the silicate solution or by introducing silica in the form of a silica sol. Preferably a mixture of an aqueous sol and an organosol is used. Polyhydroxy compounds and saccharides may be incorporated into the interlayer to improve the properties thereof and to reduce the water content. The silicate based formulations are pourable and can be used in a cast in place production process and subsequently cured to form an optically clear interlayer.

13 Claims, No Drawings

METHOD FOR THE PRODUCTION OF FIRE RESISTANT GLAZINGS

CROSS REFERENCE TO RELATED APPLICATIONS

This application is a continuation of U.S. application Ser. No. 13/301,407, file Nov. 21, 2011, now abandoned, which application was a divisional of U.S. application Ser. No. 12/312,056, filed Apr. 23, 2009, now abandoned, which was a 371 National Phase filing of PCT/GB2007/050662, filed Oct. 30, 2007. U.S. Pat. No. 13/301,407 was pending as of the filing date of this application. U.S. Pat. Nos. 13/301,407, 12/312,056 and PCT/GB2007/050662 are incorporated by reference as if set forth in their entirety herein.

BACKGROUND OF THE INVENTION

This invention relates to fire resistant glazings and to methods for the production of fire resistant glazings.

Fire resistant glazings generally comprise laminated structures having at least two transparent panes and at least one fire resistant interlayer. The transparent panes are normally glass panes although other transparent materials such as polycarbonates may be used. The interlayer must be optically clear and must remain clear without discolouration throughout the lifetime of the glazing. It must also function so as to improve the fire resistance of the glazing.

In many countries regulations exist specifying the fire resistance needed for use in particular locations. Generally these regulations specify either a minimum time for which the glazing must form a barrier to the propagation of a fire when one side of the glazing is exposed to a fire and/or a minimum time for which the temperature and/or the intensity of radiated heat on the side of the glazing which is not exposed to the fire must remain below a specified figure. Glass panes will not meet any or all of these requirements and the fire resistant glazings which have been developed are laminated glazings having at least one interlayer between at least two opposed panes.

One type of interlayer which has been developed is based upon an alkali metal silicate waterglass. These silicate layers intumesce upon exposure to heat to form an opaque foam. The foam serves to assist the retention of the glass panes and acts as a barrier to radiant heat.

One method for forming a silicate based interlayer is to pour a waterglass solution on to the surface of a glass pane and dry the solution under controlled conditions to form a thin layer on the glass. A second pane may be placed on top of the dried interlayer to form a fire resistant glazing. Such processes are in use in the production of fire resistant glazings such as those sold by the Pilkington Group of companies under its trade marks PYROSTOP and PYRODUR.

A second method of forming a fire resistant glazing is the so called cast in place method in which a solution is introduced into the space between two opposed panes and cured to form an interlayer. In a cast in place process the water content of the solution is retained in the cured interlayer. This high water content absorbs a quantity of heat during a fire but the steam generated can result in fracture of the glazing. A difficulty which is inherent in cast in place processes is the balance between the need for the solution to have a low enough viscosity to be poured into the space between two opposed glass panes and the need to cure that solution to form an interlayer which is sufficiently rigid to be retained in place throughout the lifetime of the glazing.

EP 590978 describes a cast in place process for the production of a fire resistant glass wherein the interlayer, which comprises an aqueous gel comprising an acrylamide polymer and a particulate metal oxide, is produced by introducing a dispersion comprising an acrylamide monomer, the particulate metal oxide and a photopolymersiation initiator between the glass panes and irradiating the dispersion thereby polymerising the monomers.

EP 620781 discloses a method of producing a fire resistant glazing comprising a silicate based interlayer using a cast in place process and glazings produced by that process. The interlayer is produced by pouring a solution which comprises an alkali metal silicate wherein the molar ratio of silicon dioxide to alkali metal oxide is greater than 4:1 and at least about 44% to 60% by weight water between two glass panes. The solution comprises silica acid as a curing agent. After pouring the solution is allowed to stand until it self cures to form the interlayer.

EP 981580 discloses a method for producing a fire resistant glazing comprising a silica based interlayer using a cast in place process and glazings produced by that process in which the interlayer is obtained by pouring a solution which comprises at least 35% by weight of nanoparticulate silica, from 10 to 60% by weight of a polyfunctional compound such as a polyol and from 1 to 40% by weight of a solvent. which is preferably water between two glass panes. This solution is obtained by forming a milky sol comprising the silica particles, the polyol and water and adding an alkali metal hydroxide to the sol.

DETAILED DESCRIPTION OF THE INVENTION

We have now discovered a novel method for the production of fire resistant glazings comprising a silicate based interlayer using a cast in place method which comprises combining an aqueous silicate solution with a silica sol to produce a mixture having a lower concentration of water than has previously been used. This reduced water content enables the production of fire resistant glazings having improved properties in particular in so far as they exhibit a reduced tendency for the interlayer to slump and may also exhibit improved fire resistance properties.

Accordingly from a first aspect this invention provides a method for the production of a fire resistant laminated glazing comprising a silicate based interlayer which interlayer is formed by pouring a mixture comprising an alkali metal silicate solution and a silica sol into a cavity between two opposed glass panes and allowing the mixture to cure without drying characterised in that the water content of the mixture is between 35% and 43% by weight. In the preferred processes the water content of the mixture is between 38% and 42% by weight.

We have discovered that the water content of the mixture may be reduced using one of two methods or any combination of these two methods. In a first method at least a portion of the aqueous silica sol used in the known methods is replaced by an organic silica sol. In a second method the water content of the alkali metal silicate solution is reduced. Surprisingly we have discovered that these concentrated silicate solutions, the silica sols and the mixtures comprising them are clear, that they remain pourable for a sufficient time to be useful in a production process and that they cure upon standing to produce a clear interlayer having improved properties.

The organic silica sols useful in the compositions of the present invention comprise a dispersion of silica particles in a non aqueous solvent. The sols will preferably comprise at least 30% by weight, more preferably at least 40% and most preferably at least 50% by weight of solid material.

The solvent may be any non aqueous solvent in which the desired quantity of silica may be dispersed. It will preferably be a solvent which can be incorporated into an optically clear stable interlayer. Examples of useful solvents include glycerol, ethylene glycol, propylene glycol, polyethylene glycol and trimethylol propane.

The silica particles will preferably have an average particle size in the range of from 7 nm to 50 nm. These particles are more readily dispersed in the sol and do not scatter light when incorporated in an interlayer. The organic silica sol preferably comprises an organically modified silica. Such dispersions are available as articles of commerce. They are characterised by their exhibiting a lower than expected Si—OH absorption peak in the dried form. They may be produced by forming the silica particles in an aqueous system, removing a portion of the water present and replacing it with organic material. These organically modified silicas have a more uniform particle size then those produced by dispersing silica particles in an organic medium. The incorporation of organically modified silica in the interlayers of the invention leads to products having an improved fire resistance performance. The use of organically modified silica sols represents a preferred aspect of the present invention.

The organic silica sols are preferably used in combination with aqueous silica sols. These aqueous sols also preferably have a solids content of at least 30%, preferably at least 40% and most preferably at least 50% by weight of silica. They also preferably comprise silica particles having a particle size of from 7 nm to 50 nm.

The relative proportions of the organic silica sol and the aqueous silica sol will be adjusted so as to ensure that the mixture which is produced when they are added to the silicate solution remains clear and pourable. The amount of aqueous sol which is used will also be such as to produce an interlayer comprising the desired amount of water. In general the weight of silica particles introduced in the form of an aqueous sol will be equal to or greater than that introduced in the form of a non aqueous sol. The weight introduced in the form of an aqueous sol will normally be no more than 75% by weight of the total weight of particulate silica.

The silica sols are combined with an alkali metal silicate solution wherein the molar ratio of silicon dioxide to alkali metal oxide is less than 4:1. The amount of silica sol which is added is preferably such that the molar ratio of silicon dioxide to alkali metal oxide in the mixture is at least 4:1 and preferably at least 4.5:1.

The silicate may be a lithium, a sodium or a potassium silicate or a mixture thereof. Preferably the silicate is a potassium silicate. Alkali metal silicate solutions are available as articles of commerce and conveniently one of these may be used. Sodium silicates wherein the molar ratio of silicon dioxide to sodium oxide is in the range 2:1 to 4:1 are available as articles of commerce as are potassium silicates wherein the molar ratio of silicon dioxide to potassium oxide is in the range 1.4:1 to 2.0:1.

These commercially available solutions typically comprise from 30% up to 52% by weight of solid material. They are blended with the silica sols in quantities which provide the required molar ratio of silicon dioxide to alkali metal oxide. They may be concentrated by evaporation. In the case of potassium silicate solutions which are preferred for use in the present invention the solutions may be concentrated up to a level of 62% by weight of solid material.

Aqueous silicate solutions and the interlayers obtained by allowing them to cure which comprise from 35 to 43% by weight of water and from 2 to 20% by weight of organic material are believed to be novel and comprise a second aspect of the present invention. Preferably the solutions comprise from 2% to 15% and more preferably from 2% to 12% by weight of an organic material.

The organic material may be introduced into the interlayer formulations in the form of an organic silica sol or added separately to the formulation. Organic silica sols comprising ethylene glycol or glycerol are preferred for use in this invention. Organic materials may usefully be added in order to modify the properties of the interlayer during exposure to fire.

Compounds such as ethylene glycol and glycerol act as plasticizers for the interlayer and may usefully be incorporated into interlayers which might otherwise be too brittle to exhibit the desired degree of fire resistance. Preferably the interlayer comprises up to 15% by weight and more preferably from 2 to 10% by weight of glycerol or ethylene glycol. Saccharides such as sorbitol, xylitol or mannitol act to reduce the water content of the interlayer, to bind water in the interlayer and to improve the fire resistance of the glazing. The preferred interlayers comprise from 0 to 10% by weight of the saccharide.

The formulation is poured into the cavity formed between two opposed panes which are normally glass panes. The glass panes are preferably float glass panes having a thickness of from 2.0 to 8.0 mm. The panes may have a heat reflective coating upon at least one surface. Glass panes having such a coating are well known in the art and are available as articles of commerce.

One example of a coated glass which may be used is the low emissivity glass sold by the Pilkington Group under its trade mark K Glass. Preferably the float glass panes are toughened glass panes. The panes may also be formed from borosilicate glasses or from ceramic glasses such as those sold by the Nippon Electric Glass Company under the Trade Mark FIRELITE.

The narrow sides of the cavity are closed using a suitable sealant which extends around the perimeter of the panes. The width of the space between the panes is preferably in the range 2 mm to 12 mm, more preferably from 2 to 8 mm and most preferably in the range 3 mm to 6 mm. The formulation is subject to a degassing step and then poured into the cavity through an opening in the sealant. When the cavity is full the opening is closed and the glazing allowed to stand for a time which is sufficient to allow the formulation to cure. The curing may be accelerated by heating the glazing to an elevated temperature say 50 to 90° C.

The invention is illustrated by the following examples. The formulations having the compositions presented as Table 1 were made up by premixing ethylene glycol with the silica sols and the saccharide. These premixed sols were added at a steady rate to the potassium silicate solution with stirring at room temperature. The solution was degassed under reduced pressure and cast into cells made of 5 mm toughened glass with a 3 mm cavity. The solution was cured at elevated temperature to form a solid interlayer.

| Example No | Molar Ratio SiO$_2$:K$_2$O | Water Content % | Water content potassium silicate | ethylene glycol % | Silica sol in ethylene glycol (50%) % | Sorbitol % | Max Size/m | Fire test |
|---|---|---|---|---|---|---|---|---|
| 1 | 4.7 | 43.9 | 47.6% | 5 |  | 5 | 1.2 × 2.3 | Fails EW 60 |
| 2 | 4.7 | 41.0 | 47.6% |  | 10 | 5 | 1.2 × 2.3 | Passes EW 60 |
| 3 | 5.0 | 41.0 | 47.6% |  | 10 | 5 | 1.5 × 2.6 | Passes EW 60 |
| 4 | 4.7 | 40.0 | 40.4% | 5 |  | 5 | 1.2 × 2.3 | Passes EW 60 |
| 5 | 5.0 | 40.0 | 40.4% | 5 |  | 5 | 1.5 × 2.6 | Passes EW 60 |
| 6 | 5.0 | 37.0 | 40.4% |  | 10 | 5 | 1.2 × 2.3 | Passes EW 60 |

The invention claimed is:

1. A cast in place method of producing a fire resistant laminated glazing, said glazing comprising a silicate based interlayer which interlayer comprises up to 15% by weight of glycerol or ethylene glycol, and with a water content of between 35 and 43% by weight and which is disposed between two opposed glass panes, said method comprising the steps of:
    i) obtaining a silicate based interlayer by preparing an aqueous silicate mixture, said mixture including a total water content of between 35% and 43% by weight, by mixing together:
        A) an alkali metal silicate solution; and
        B) an aqueous silica sol premixture comprising:
            a) an aqueous silica sol with a solids content of at least 30% by weight; and
            b) optionally an additive,
    ii) degassing the mixture;
    iii) pouring the mixture-into a cavity formed from the two opposed glass panes; and
    iv) allowing the mixture to cure upon standing and without drying to form the silicate based interlayer, with improved fire resistance properties and a reduced tendency to slump.

2. The method according to claim 1, wherein the water content of the mixture is between 38% and 42% by weight.

3. The method according to claim 1, wherein the silica sol comprises a mixture of an aqueous silica sol and an organic silica sol.

4. The method according to claim 1, wherein the sols comprise at least 30% by weight of solid material.

5. The method according to claim 4, wherein the sols comprise at least 50% by weight of solid material.

6. The method according to claim 1, wherein the silica sol comprises particles having an average particle size in the range 7 to 50 nm.

7. The method according to claim 1, wherein the alkali metal silicate solution comprises from 40% to 62% by weight of water.

8. The method according to claim 7, wherein the alkali metal silicate is a potassium silicate.

9. The method according to claim 8, wherein the potassium silicate comprises a molar ratio SiO$_2$ to K$_2$O of at least 1.4:1.

10. The method according to claim 1, wherein the molar ratio of SiO$_2$ to M$_2$O, where M represents an alkali metal cation in the mixture, is at least 4:1.

11. The method according to claim 10, wherein the molar ratio of SiO$_2$ to M$_2$O is at least 4.5:1.

12. A cast in place method of producing a fire resistant laminated glazing, said glazing comprising a silicate based interlayer which interlayer comprises up to 15% by weight of glycerol or ethylene glycol, and with a water content of between 35 and 43% by weight and which is disposed between two opposed glass panes, said method comprising the steps of:
    i) obtaining a silicate based interlayer by preparing an aqueous silicate mixture, said mixture including a total water content of between 35% and 43% by weight, by mixing together:
        A) an alkali metal silicate solution; and
        B) an aqueous silica sol premixture comprising:
            a) an aqueous silica sol with a solids content of at least 30% by weight, and an organic silica sol comprising a dispersion of silica particles in a non-aqueous solvent and with at least 30% by weight solid material; and
            b) optionally an additive,
    ii) degassing the mixture; and
    iii) pouring the mixture into a cavity formed from the two opposed glass panes; and
    iv) allowing the mixture to cure upon standing and without drying to form the silicate based interlayer with improved fire resistance properties and a reduced tendency to slump.

13. A cast in place method of producing a fire resistant laminated glazing, said glazing comprising a silicate based interlayer which interlayer comprises up to 15% by weight of glycerol or ethylene glycol and which is disposed between two opposed glass panes, said method comprising the steps of:
    i) obtaining a silicate based interlayer by preparing an aqueous silicate mixture, said mixture including a total water content of between 35% and 43% by weight, by mixing together:
        A) an alkali metal silicate solution; and
        B) an aqueous silica sol premixture comprising:
            a) an aqueous silica sol with a solids content of at least 30% by weight; and
            b) optionally an additive,
    ii) degassing the mixture;
    iii) pouring the mixture into a cavity formed from the two opposed glass panes; and
    iv) allowing the mixture to cure upon standing and without drying to form the silicate based interlayer, with improved fire resistance properties and a reduced tendency to slump; wherein
    the silica sol comprises a mixture of an aqueous silica sol and an organic silica so and weight introduced in the form of an aqueous sol will be no more than 75% by weight of the total weight of particulate silica.

* * * * *